US009976540B2

(12) United States Patent
Guyot

(10) Patent No.: US 9,976,540 B2
(45) Date of Patent: May 22, 2018

(54) FLOATING WIND TURBINE STRUCTURE

(71) Applicant: Marc Guyot, Orvault (FR)

(72) Inventor: Marc Guyot, Orvault (FR)

(*) Notice: Subject to any disclaimer, the term of this patent is extended or adjusted under 35 U.S.C. 154(b) by 96 days.

(21) Appl. No.: 14/783,933

(22) PCT Filed: Apr. 17, 2014

(86) PCT No.: PCT/EP2014/001037
§ 371 (c)(1),
(2) Date: Oct. 12, 2015

(87) PCT Pub. No.: WO2014/170027
PCT Pub. Date: Oct. 23, 2014

(65) Prior Publication Data
US 2016/0061192 A1    Mar. 3, 2016

(30) Foreign Application Priority Data

Apr. 18, 2013 (FR) .................................... 13 00926

(51) Int. Cl.
*F03D 1/06* (2006.01)
*F03D 13/25* (2016.01)
(Continued)

(52) U.S. Cl.
CPC ........... *F03D 13/25* (2016.05); *F03D 1/0608* (2013.01); *F03D 1/0666* (2013.01);
(Continued)

(58) Field of Classification Search
CPC . F03D 1/001; F03D 1/005; F03D 1/06; F03D 1/065; F03D 1/0608; F03D 1/0666; F03D 1/0691; F03D 9/30; F03D 13/20; F03D 13/22; F03D 13/25; F03D 13/40; F03D 80/80; F03D 80/82; F03D 80/85;
(Continued)

(56) References Cited

U.S. PATENT DOCUMENTS

| 8,197,208 B2 * | 6/2012 | Sharples | F03D 1/0608 415/7 |
| 8,668,455 B2 * | 3/2014 | Finnell | F03D 1/0608 416/132 B |
| 9,270,150 B2 * | 2/2016 | Sharples | F03D 1/0608 415/7 |

FOREIGN PATENT DOCUMENTS

| DE | 19851735 A1 * | 5/2000 | .............. B63B 1/125 |
| DE | 20 2010 003654 U1 | 7/2011 | |

(Continued)

OTHER PUBLICATIONS

International Search Report, dated Jul. 16, 2014, from International Phase of the instant application.

*Primary Examiner* — Igor Kershteyn
*Assistant Examiner* — Brian P Wolcott
(74) *Attorney, Agent, or Firm* — Cahn & Samuels, LLP

(57) ABSTRACT

A floating wind turbine structure comprising: a rotor carrying at least one blade, at least two support arms supporting a nacelle, said at least two support arms comprising upper and lower portions, said upper portions being associated with the nacelle and said lower portions being associated with means in the shape of floats, at least one support arm located upstream from the rotor relative to the wind direction, at least one support arm located downstream from the rotor relative to the wind direction, characterized in that the rotor is provided with a hollow shaft arranged to rotate about the nacelle.

11 Claims, 3 Drawing Sheets

(51) Int. Cl.
  *F03D 13/20*    (2016.01)
  *B63B 35/44*    (2006.01)
  *B63B 21/50*    (2006.01)
  *B63B 1/10*     (2006.01)
  *B63B 1/12*     (2006.01)

(52) U.S. Cl.
  CPC ............ *F03D 1/0691* (2013.01); *F03D 13/20* (2016.05); *B63B 1/107* (2013.01); *B63B 21/50* (2013.01); *B63B 35/44* (2013.01); *B63B 2001/128* (2013.01); *B63B 2035/446* (2013.01); *F05B 2240/93* (2013.01); *Y02E 10/721* (2013.01); *Y02E 10/726* (2013.01); *Y02E 10/727* (2013.01)

(58) Field of Classification Search
  CPC .. F03D 80/88; F03D 80/55; F05B 2230/6102; F05B 2230/70; F05B 2240/93
  See application file for complete search history.

(56) References Cited

FOREIGN PATENT DOCUMENTS

| | | | |
|---|---|---|---|
| KR | 2011 0003919 A | 1/2011 | |
| WO | WO 01/73292 A1 | 10/2001 | |
| WO | WO 2012150623 A1 * | 11/2012 | ............... F03D 1/06 |

\* cited by examiner

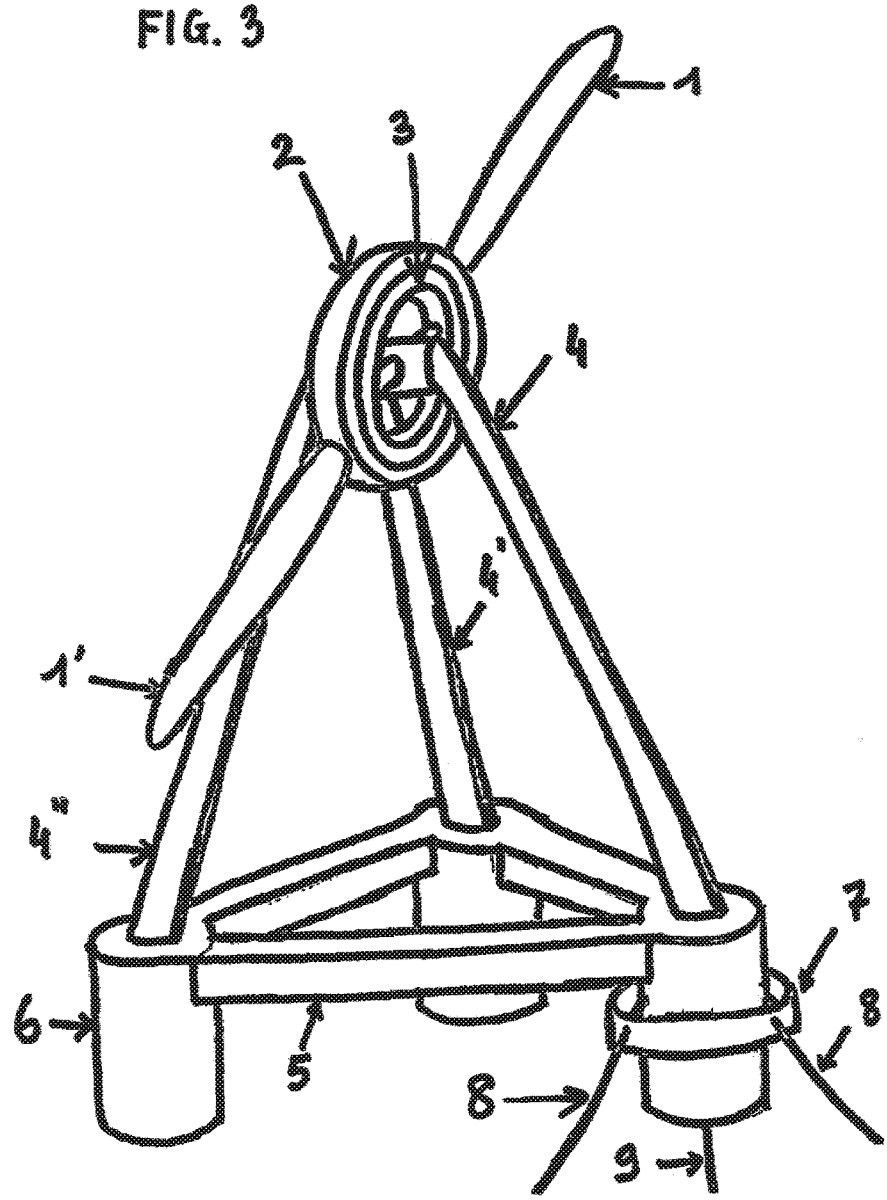

FLOATING WIND TURBINE STRUCTURE

FIELD OF THE INVENTION

The present invention relates to a floating wind turbine structure.

BACKGROUND OF THE INVENTION

More particularly, the invention relates to a floating support such as this which comprises means in the form of support arms, the upper part of which is associated with the nacelle of the wind turbine and the lower part of which is associated with means in the form of a float and optionally with means forming ballast, the added mass and the damping system.

A wide variety of floating supports of this type using a single mast per wind turbine nacelle are already known from the prior art.

However, it is understood that such means in the form of a single support mast concentrate the mechanical stresses at the foot of the mast and at the head of the mast. Since these stresses are cyclical owing to the movements of the float and the variations of the wind in particular, it is understood that the dimensioning of the structure, in particular in terms of mechanical fatigue, is affected thereby.

It is likewise understood that such means in the form of a single mast are extremely close to the blade or blades of the rotor during passage thereof into the vertical position with the end of the blade pointing to the ground. When the blade or blades pass near the mast, it is understood that the aerodynamic load on the blade or blades is severely changed owing to aerodynamic disturbances which are greater, the larger the diameter of the mast and the smaller the distance between the blade(s) and the mast. It is readily understood that the variation of said aerodynamic load generates cyclical forces, mechanical stresses and associated fatigue.

SUMMARY OF THE INVENTION

The aim of the invention is thus to solve these problems by proposing a more lightweight, more economic wind turbine structure permitting a greater yield of energy.

To this end, a first aspect of the invention is to provide a floating wind turbine structure which comprises means in the form of several support arms of the nacelle, the upper part of which is associated with the nacelle and the lower part of which is associated with means in the form of floats and optionally means forming the ballast, the added mass and the damping system. As is known to a person skilled in the art, the nacelle is the means allowing, on the one hand, the torque generated by the blade(s) of the rotor moved by the wind to be transformed into an energy flow, usually electric or hydraulic in nature, and, on the other hand, allowing the rotor and its blade(s) to be held in position. The structure comprises one support arm of the nacelle at least upstream of the nacelle in relation to the direction of the wind. The structure comprises one support arm of the nacelle at least downstream of the nacelle in relation to the direction of the wind. Therefore, the structure allows a wind turbine rotor with a horizontal or almost horizontal spindle formed of one or more blades to rotate freely about the theoretical axis of the rotor. In other words, the structure allows the upper ends of the upstream and downstream arms to be connected rigidly, for example welded or bolted, without hindering the rotation of the rotor and its blade(s). This link can be effected either via at least one rigidly connected connection piece or by fixing the upper ends of the arms to each other directly. Therefore, there is structural continuity between the arms at their upper end and there are no relative movements between the arms and said at least one connection piece if present.

Therefore, the natural resonance frequencies of such a structure are substantially higher than that of a floating wind turbine structure with a fixed single mast such that the vibration problems encountered on these wind turbines are considerably reduced. In fact, the natural resonance frequencies of these wind turbines with steel masts are in the range of excitation frequency caused by the rotation of the blades, which requires, for example, the diameter of the mast to be increased to offset the inherent frequencies of the structure and therefore the cost of the structure to be increased.

It is readily understood that the rotor can no longer pivot fully about the vertical axis as the wind turbines known from the prior art do. It is readily understood that the minimum distance between each of the arms and the blade(s) during passage thereof next to the arms is increased significantly in relation to a single vertical mast, and all the more so when the inclination of the support arms relative to the vertical is large. It is readily understood that this minimum distance between a blade portion and a support arm is all the greater as the distance to the rotational axis of the rotor increases, which is favourable for the blade portions furthest away from the rotational axis of the rotor which are the major source for capturing the energy of the wind and thus the major source of energy production. The inclination of the arms thus allows the yield of energy of the wind turbine to be improved. Advantageously, the inclination of the arms relative to the vertical is between 5 and 55 degrees, or even more advantageously between 10 and 45 degrees.

In accordance with another embodiment, the spindle of the rotor bearing the blade(s) is a hollow spindle so that the nacelle and the upper part of the support arms can be connected together in said hollow spindle. The inner diameter of said hollow spindle could possibly be relatively large with respect to the outer diameter of the rotor and of the blade(s), i.e. the diameter described by the end of the largest blade. The ratio between these two diameters could be between two and fifty percent. Therefore, the free length of the blade(s) will be reduced for the same outer diameter of the rotor bearing the blade(s) without significantly reducing the aerodynamic torque since the blade portions close to the centre of the rotor do not generate, or only generate very little, torque. As is known to the person skilled in the art, the major portion of the torque produced by the rotor and its blade(s) comes from the blade half furthest away from the rotational axis of the rotor. Therefore, reducing the length of the blade(s) for the same total outer diameter of the rotor-blade assembly generates a free length of the shorter blades and thus weaker mechanical stresses at the root of the blade, which reduces the cost of the blades.

On the other hand, by increasing the diameter of the hollow spindle, the available space to connect the arms at their upper end is increased, which enables the mechanical forces, notably as a result of the thrust of the wind on the blades in the direction of the wind, to be distributed and diffused. The mechanical stresses in the structure are thus diminished thereby. Therefore, the structure is easier to implement.

In accordance with another embodiment, the support arms are possibly streamlined or profiled so as to reduce the aerodynamic disturbances on the blades of the rotor and to limit the wind surface. The profile could have an NACA profile shape. Preferably, the drag coefficient (Cd) will be less than 0.5, or even less than 0.2. This type of profile is not suitable for a wind turbine known from the prior art because the nacelle thus faces the wind without the fixed mast being able to pivot. With such a wind turbine of the prior art, a mast with a profiled cross-section would be advantageous in terms of aerodynamic drag only for a single wind direction. As soon as the wind is no longer aligned with the chord of the profiled cross-section of the mast, the aerodynamic disturbances would become greater than with a circular cross-section. It is for this reason that the masts of the wind turbines of the prior art are, for the most part, circular so that the yield is the same regardless of the direction of the wind.

In accordance with another embodiment, the support arms of the nacelle can optionally be connected together by holding arms, which are optionally horizontal, placed in the lower part of the bearing structure. Therefore, the support arms of the nacelle are connected together rigidly, on the one hand in their upper part at the nacelle and, on the other hand, in their lower part above and/or below the surface of the water by holding arms. Such a device allows the structure to be made more rigid.

In accordance with another embodiment, the orientation of the wind turbine relative to the direction of the wind is achieved by one or several means. The first means consists of a self-orientation of the wind turbine relative to its mooring point(s). For this, the mooring point(s) of the anchoring lines is/are placed upstream of the position of the centre of sail force relative to the wind. It is understood that an anchoring line is the means to connect the floating wind turbine at the bottom of the sea or lake and that the centre of sail force is the barycentre of the horizontal forces exerted by the wind on the blade(s) and the emerging parts of the floating wind turbine subjected to the action of the wind. Therefore, the wind turbine automatically orientates itself so as to face the wind in the same manner as a vessel at anchor. The second means is formed by virtue of an orientable nacelle which pivots at the tip of the support arms of the nacelle about a vertical axis and/or a horizontal axis perpendicular to the rotational axis of the blades. Although limited by the presence of the support arms, the rotational movement of the nacelle about the vertical axis allows the orientation of the wind turbine to be adjusted so as to, for example, deflect the aerodynamic wake or counteract the effect of a swell, the orientation of which would be different from the orientation of the wind. This enables the aerodynamic yield of the wind turbine to be guaranteed whatever the orientation of the wind and of the swell. As is known by the person skilled in the art, the wake of a wind turbine is characterised by an area downstream of the wind relative to the wind turbine in which the average speed of the flow is lower than upstream of the wind turbine and the turbulence is higher than upstream of the wind turbine. Said means of rotating the nacelle allowing the wake to be deflected thus allows the wake area to be moved so that said wake area does not disturb the aerodynamic yield of the floating or fixed wind turbines which are disposed downstream. As is known by the person skilled in the art, wind turbines are sometimes grouped together in a wind farm. The invention can optionally use a swinging nacelle characterised in that the nacelle of the wind turbine is connected to the bearing structure by a pivot link which has an axis which is horizontal and perpendicular to the axis of the rotor. This allows the orientation of the rotor and of its blade(s) to be adjusted so that said rotor provided with its blades is perpendicular to the wind vector regardless of the inclination of the floating wind turbine subjected to the thrust of the wind and the forces caused by the swell. This also allows the wake of the wind turbine to be deflected so as not to disturb the operation of wind turbines possibly disposed downstream. The invention can optionally use a conical rotor or a rotor with variable conicity, i.e. one in which the blades of the rotor are oriented, or can be oriented, relative to the rotational axis of the rotor such that the blades sweep a conical surface rather than a disc. The claimed wind turbine structure is better adapted to this type of conical rotor than the conventional structures which are limited by the distance between the nacelle and the mast.

In accordance with another embodiment, the wind turbine structure comprises one or several mooring points of one or several anchoring lines located on the outer part of a reel formed of two concentric parts at least, the two parts kinematically forming at least one pivot having a vertical rotational axis, the inner part of the reel being fixedly attached to the floating structure of the wind turbine and being recessed in its centre along the vertical rotational axis between said two parts.

The wind turbine structure comprises an umbilical, an element comprising the electrical power transmission cables and the data transmission and control cables, which passes via the recessed part of the reel fixedly attached to the structure of the wind turbine. Therefore, the umbilical is not in contact with the anchoring lines whatever the orientation of the wind turbine relative to the bottom of the sea.

In other words, the floating wind turbine structure is arranged to be moored via at least one mooring point and comprises:
  a through-going recessed reel arranged to form at least one pivot with a vertical rotational axis so as to allow the pivoting of said wind turbine structure relative to said mooring points,
  an umbilical,
characterised in that the umbilical passes into the recess of said reel.

A final aspect of the invention consists of a floating wind turbine comprising:
  a floating support,
  a rotor provided with at least one blade arranged to turn under the effect of the wind in a plane substantially perpendicular to the direction of the wind, said plane defining an upwind wind turbine area and a downwind wind turbine area,
  a nacelle arranged to transform the rotation of the wind into an energy flow,
  a frame arranged to support the rotor, said frame comprising at least one first arm and at least one second arm, which are fixed relative to the float and connected to each other in a rigid manner,
characterised in that said at least one first arm is in the upwind wind turbine area and said at least one second arm is in the downwind wind turbine area so as to guarantee structural continuity between the upwind and downwind wind turbine areas.

The main advantages of this invention are:
  the increase in the blade-arm distance and thus the reduction in the cyclical forces and mechanical fatigue on the blade(s),
  the reduction in the aerodynamic disturbances generated by the usual support mast of the nacelle and thus the reduction in the cyclical forces and mechanical fatigue on the blade(s), said reduction being due, on the one hand, to the small diameters of the support arms relative to the larger diameter of a single mast and, on the other hand, to the aerodynamic shape of the support arms, a shape made possible by the fact that the entire structure of the wind turbine faces the wind, which is not the case for a wind turbine in which only the nacelle faces the wind, the fixed mast having to be designed for all possible orientations of the wind, the reduction in the concentrations of stresses in the floating wind turbine structure, made possible, on the one hand, by the multiplication of the support arms of the nacelle and their positioning, and, on the other hand, by the large available space within the hollow spindle of the rotor which can be used to distribute and diffuse the forces at the upper junction of the support arms and of the nacelle, as well as by the rigid linking of the arms to one another, the increase in the inherent frequencies of the structure relative to the structures known from the prior art, which allows the structure to not be over-dimensioned so as to offset said inherent frequencies and thus guarantee that the structure does not resonate with the excitation caused by the rotor, the reduction in the length of the blade(s) for the same total outer diameter of the rotor-blade(s) assembly which results in a shorter free length of the blades and thus weaker mechanical stresses at the root of the blade.

BRIEF DESCRIPTION OF THE DRAWINGS

The invention will be better understood with the following examples which are given by way of example only. The enclosed drawings illustrate the invention.

FIG. 3 schematically shows the device in accordance with the invention in three dimensions.

DETAILED DESCRIPTION OF THE EMBODIMENTS

Figure 1:
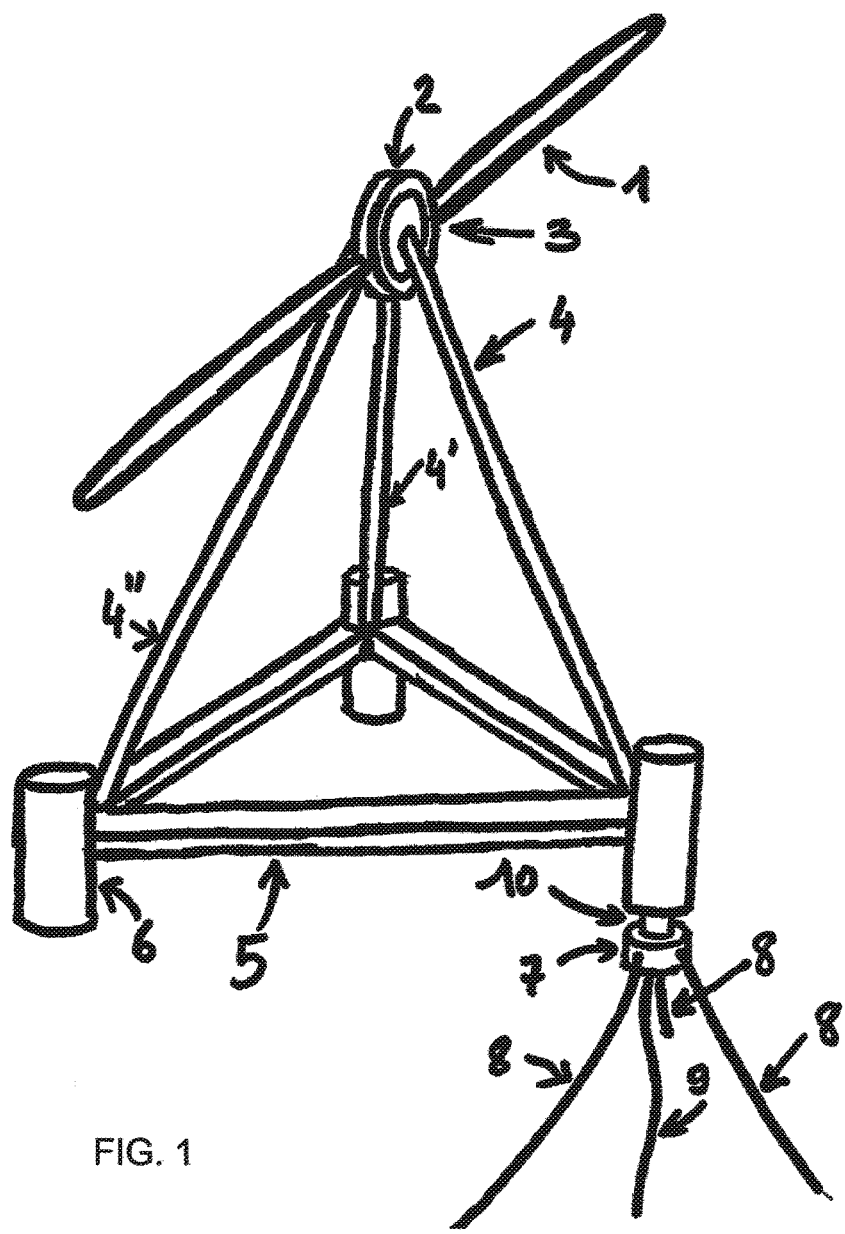
FIG. 1 schematically shows the device in accordance with the invention in three dimensions.

As shown in FIG. 1, the two blades, general reference (1) for one of them in the figure, are connected to the rotor, reference (2) in the figure. Said rotor, containing in particular the rotor of the electricity generator and the components necessary for adjusting the blades, is pivotally connected to the nacelle, reference (3) in the figure. The assembly formed of the blades, reference (1) for one of them in the figure, and the rotor, reference (2) in the figure, is also called a propeller. The electricity generator can be replaced by a system of hydraulic pumps, a heat-producing device or any other system allowing a flow of energy. For ease of illustration, the nacelle support arm upstream of the wind, reference (4) in the figure, is connected directly to the nacelle right in its centre, reference (3) in the figure. In practice, said nacelle, possibly recessed in its centre, is for example connected to the three arms (4), (4') and (4"), reference (4) for the nacelle support arms upstream of the wind in the figure, by a metallic tubular framework, not shown in the figure. The assembly formed of the arms (4), (4') and (4") and of the metal framework connecting them is also called a frame. In order to assemble the structure, the nacelle and the blades are first assembled on the ground then the assembly is hoisted at the upper part of the support arms of the nacelle so as to be able to fix the nacelle to the support arms. It is readily understood that the blades, upon rotation thereof about the horizontal axis parallel to the wind, pass into the tetrahedral geometric shape delimited by the three arms. Said nacelle support arms are connected in the example to horizontal and flattened holding arms, one of the holding arms being referenced (5) in the figure. The assembly of the arms is connected to three vertical cylindrical floats, one of the floats being referenced (6) in the figure. The outer part of the reel, reference (7) in the figure, is pivotally connected to the wind turbine structure. In the example, three catenary-type anchoring lines are moored to said outer part, one of the anchoring lines being referenced (8) in the figure. The umbilical, reference (9) in the figure, passes along the vertical rotational axis of the outer part of the reel, reference (7) in the figure. The inner part of the reel, reference (10) in the figure, is fixedly attached to the wind turbine structure and is recessed in its centre along the vertical axis so as to leave a space for the passage of the umbilical.

Figure 2:
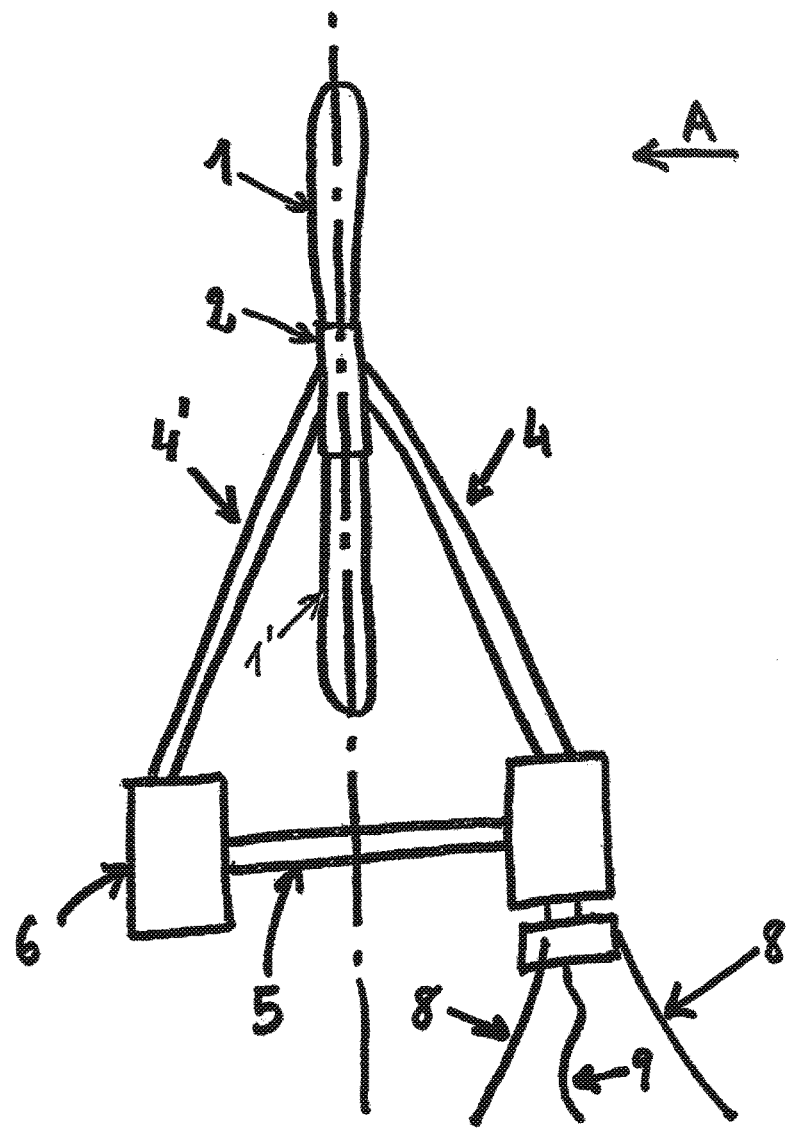
FIG. 2 schematically shows a profile view of the device in accordance with the invention.

As shown in FIG. 2, the letter A designates the wind direction. The propeller, formed of at least one blade, references (1) and (1') in the figure, and of the rotor, reference (2) in the figure, sweeps, upon rotation thereof, an approximately flat, optionally conical, surface. This surface separates the space into two areas. A first wind turbine area upwind, also called an area upstream of the wind, in which the arm referenced (4) in the figure is located. A wind turbine area downwind, also called an area downstream of the wind, in which the arm referenced (4') in the figure is located. Said plane is generally perpendicular, plus or minus 20°, to the wind vector, described by a norm, an axis and a direction (A). Said plane is thus substantially normal to the wind direction. The device formed of the nacelle and of the propeller can have means for adjusting the orientation as known by a person skilled in the art with means such as jacks or an assembly of a toothed crown and pinion. The arms referenced (4) and (4') in the figure are rigidly connected by their upper end. There is thus structural continuity in the whole of the structure formed by the floats, reference (6) in the figure, the pontoons, reference (5) in the figure, and the arms, references (4) and (4') in the figure, which allow the structure to be made rigid.

As shown in FIG. 3, the blades, references (1) and (1') in the figure, drive the rotor, reference (2) in the figure. The rotor is connected to the nacelle, reference (3) in the figure, by at least one roller bearing, preferably a set of roller bearings, so as to ensure the pivotally connected kinematic guiding of the rotor relative to the nacelle. The part of said rotor having a generator electric rotor function could optionally be guided using one or two roller bearings which will not take up any sail force thrust but will ensure a high level of precision and a small clearance between the rotor and stator parts of the generator. In this example, said generator is used with direct coupling without a gear reduction device. The rotor of said generator uses permanent magnets or a wound rotor and is placed around the stator of the generator and not within it. It is thus an external generator rotor. The nacelle, reference (3) in the figure, is connected to the support arms (4), (4'), (4") via a pivot in this case. FIG. 3 clearly shows the structural continuity between the upstream support arm, reference (4) in the figure, and the downstream support arms, reference (4') and (4"). This structural continuity enables a more rigid and more lightweight floating structure to be achieved. The floating structure is thus less expensive to produce owing to a lower amount of material. Furthermore, the natural resonance frequencies of such a structure are substantially higher than that of a floating wind turbine structure with a single fixed mast. Therefore, the vibration problems encountered in the wind turbines known from the prior art are considerably reduced. In fact, as is known by the person skilled in the art, the natural resonance frequencies of the wind turbines known from the prior art with steel masts are in the excitation frequency range caused by the rotation of the blades, which means, for example, that the diameter of the mast must be increased to offset the inherent frequencies of the structure, and therefore the cost must be increased.

As shown in FIG. 3, the rotor, reference (2) in the figure, and its blades, references (1) and (1') in the figure, is not disposed cantilevered from the nacelle. Consequently, contrary to the wind turbines known from the prior art, the nacelle, reference (3) in the figure, is not subjected to a large bending moment as a result of the mass of said rotor and said blades. These weaker forces allow the dimensioning of the structure, and thus the cost, to be reduced.

As shown in FIG. 3, the nacelle, reference (3) in the figure, can pivot relative to the floating structure so as to adjust the orientation of the surface swept by the blades, references (1) and (1') in the figure. When the floating structure pitches under the action of the sea or wind, said swept surface can, for example, be oriented to perfectly face the wind, for example by a system of jacks.

As shown in FIG. 3, the ratio between the diameter of the hollow spindle of the rotor, reference (2) in the figure, and the diameter of the circular surface swept by the blades, references (1) and (1') in the figure, is in the order of 20%. Therefore, the electrical generator, for example a permanent magnet or wound rotor synchronous generator directly coupled to said rotor, has a much larger diameter than the generators used in wind turbines known from the prior art. As is known by the person skilled in the art, this larger diameter allows a reduction in the mass of active material necessary for obtaining a level of given specifications, such as for example a level of nominal torque of the generator. The cost of said generator is thus reduced thereby. Furthermore, the available space within the nacelle allows major surfaces to take up the forces due to the torque of the generator, the sail force, gravity and inertia. For ease of illustration, the upper part of the support arm upstream of the wind, reference (4) in the figure, does not use any of the available space. As is known by the person skilled in the art, it is understood that the local mechanical stresses are weaker when the forces are distributed. The resistance of the structure to fatigue is thus improved thereby which allows the masse and cost of the structure to be reduced. Similarly, the bending moment at the root of said blades is reduced relative to the wind turbines known from the prior art since the free length of said blades is reduced owing to said large-diameter rotor. The resistance of said blades to fatigue is thus improved thereby which allows the mass and cost of said blades to be reduced.

As shown in FIG. 3, the support arms, references (4), (4') and (4") in FIG. 3, are inclined and provided with profiled and non-circular cross-sections allowing a reduction in aerodynamic disturbances, which is favourable for improved aerodynamic operation of the blades. As is known by a person skilled in the art, the mast of the wind turbines known from the prior art is systematically vertical and the axis of the rotor bearing the blades is inclined a few degrees, e.g. 6°, so as to just provide sufficient distance between said mast and the blades during passage thereof in front of said mast. It is readily understood that the distance between the blades, references (1) and (1') in FIG. 3, and said support arms increases as the distance to the rotor increases, which is favourable for improved aerodynamic operation of the blades.

As shown in FIG. 3, the outer part of the reel, reference (7) in the figure, is connected to the wind turbine structure via a ball and socket joint.

The device is particularly suitable for floating wind turbine structures with a horizontal axis whatever the type of float. This device is particularly suitable for floats of the following type: floating barge, SPAR, semi-submersible or floating platform provided with a damping water tank.

The invention claimed is:

1. A floating wind turbine structure comprising:
   a nacelle;
   a rotor bearing a blade, said rotor circumscribing said nacelle;
   first and second support arms of the nacelle, the first and second support arms comprising upper and lower parts, the upper parts are associated with the nacelle and the lower parts are associated with means in the form of floats, the first support arm being located upstream of the rotor relative to a wind direction, the second support arm being located downstream of the rotor relative to the wind direction;
   wherein the rotor is provided with a hollow spindle arranged to rotate around the nacelle.

2. A floating wind turbine structure as claimed in claim 1, wherein the upper parts of the first and second support arms are rigidly connected together.

3. A floating wind turbine structure as claimed in claim 1 comprising a mooring point, wherein the mooring point is located upstream of a center of sail force relative to the wind direction.

4. A floating wind turbine structure as claimed in claim 1, characterised in that the first and second support arms include a non-circular cross section so as to limit aerodynamic disturbances on the blade.

5. A floating wind turbine structure as claimed in claim 1, wherein the hollow spindle of the rotor having a bore of revolution, wherein a ratio between a diameter of the bore and a maximum outer diameter defined by an end of the blade upon rotation of the rotor about the nacelle is between two and fifty percent.

6. A floating wind turbine structure as claimed in claim 1 arranged to be moored via a mooring point and further comprising:
   a through-going recessed reel arranged to form a pivot with a vertical rotational axis so as to allow pivoting of the floating wind turbine structure relative to the mooring point, and
   an umbilical wherein the umbilical passes into a recess of the through-going recessed reel.

7. A floating wind turbine structure as claimed in claim 1 wherein said rotor is connected to said nacelle by at least one roller bearing.

8. A floating wind turbine structure as claimed in claim 1 wherein said rotor is connected to said nacelle by a set of roller bearings.

9. A floating wind turbine structure as claimed in claim 1 wherein said rotor is connected to said nacelle such that said rotor moves relative to said nacelle.

10. A floating wind turbine structure as claimed in claim 1 wherein said nacelle is pivotable about an axis that is perpendicular to an axis of rotation of said rotor.

11. A floating wind turbine structure comprising:
    a nacelle;
    a rotor including a blade, said rotor circumscribing said nacelle and being connected to said nacelle such that said rotor rotates relative to said nacelle, said nacelle being pivotable about an axis that is perpendicular to an axis of rotation of said rotor;

at least first and second support arms rigidly connected to each other and said nacelle at first ends, the at least first and second support arms including a non-circular cross section.

* * * * *